EDWARD NEUSCHASTLE, INVENTOR.

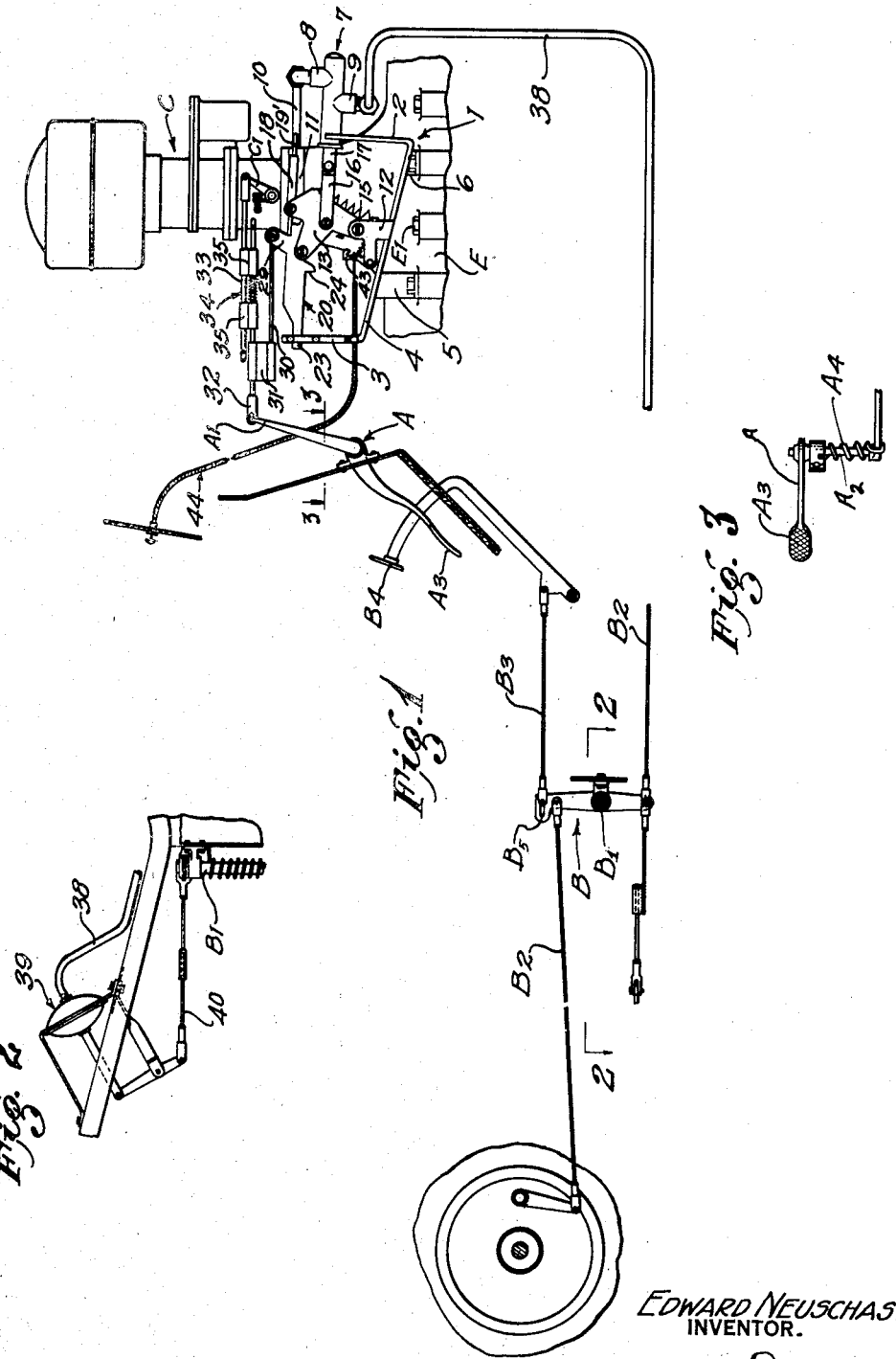

BY his ATTORNEY.

June 6, 1939.  E. NEUSCHASTLE  2,161,426
ROBOT BRAKE CONTROL
Filed June 7, 1937  3 Sheets-Sheet 3
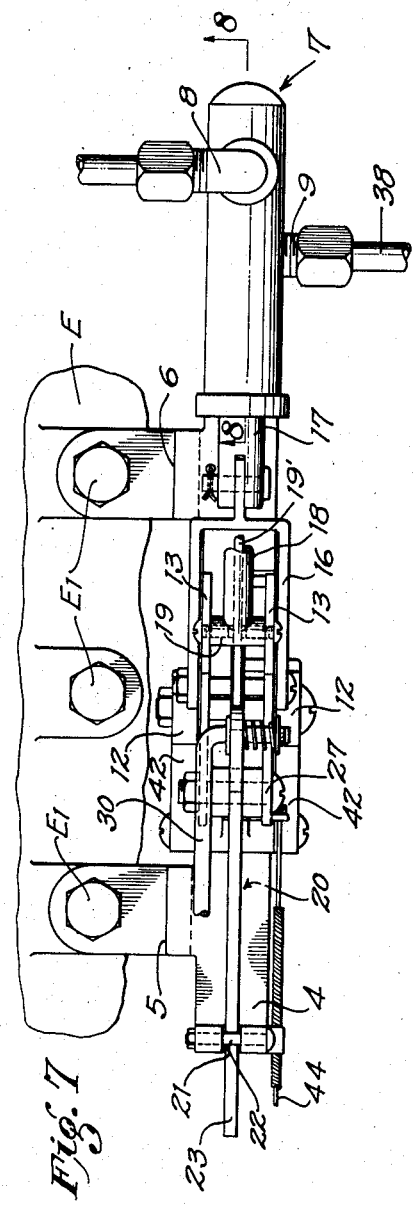
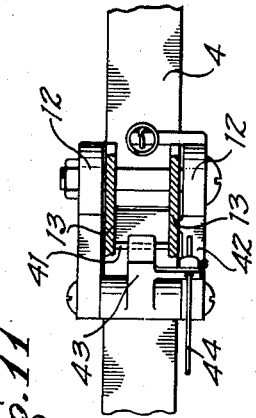
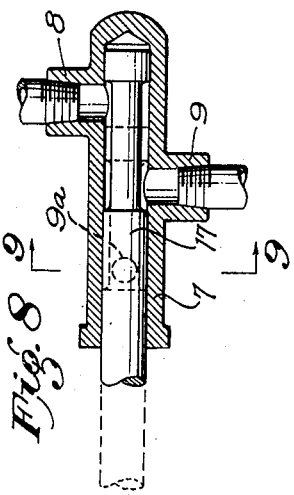
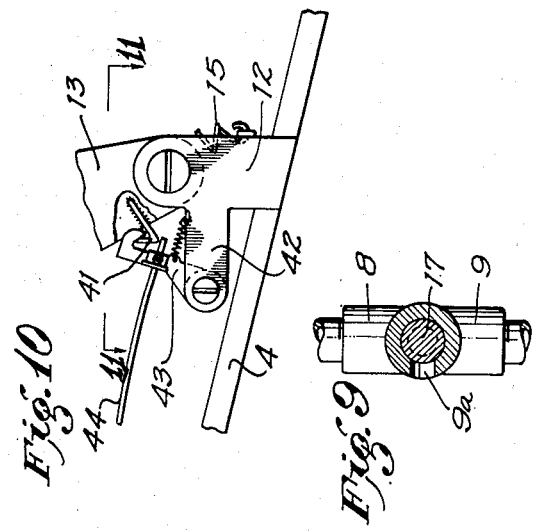
EDWARD NEUSCHASTLE,
INVENTOR.
BY Larrabee
his ATTORNEY.

Patented June 6, 1939

2,161,426

UNITED STATES PATENT OFFICE 2,161,426

ROBOT BRAKE CONTROL

Edward Neuschastle, Los Angeles, Calif., assignor of one-third to Henry Mach Smith and one-tenth to Marcus C. Clark, both of Los Angeles, Calif.

Application June 7, 1937, Serial No. 146,817

8 Claims. (Cl. 192—3)

My invention relates to combined accelerator and brake control apparatus designed for incorporation in the control system of a vehicle.

An object of my invention is to provide a control apparatus of this character whereby an automobile driver may effect application of the brakes merely by relaxing the pressure of his foot on the accelerator pedal.

A further object is to provide a combined accelerator and brake control apparatus which materially reduces and minimizes the time lag heretofore occurring between release of the accelerator and application of the brakes, thereby providing an apparatus of this character which is particularly suited for the present day high-speed automobiles which commonly exceed a velocity of one hundred feet per second, inasmuch as each fraction of a second gained between sensing an impending emergency and acting to meet the situation may be the difference between safety and a serious accident.

A further object is to provide an apparatus of this class which is so arranged that the operator may readily and quickly learn the neutral or idling position of the accelerator pedal so that the pedal may be moved to such position without applying the brakes.

A further object is to provide an apparatus of this class which need not interfere in any manner whatsoever with the conventional braking system, thus even though the apparatus should fail to function, the operator may apply the brakes in the usual manner with no loss of time over the present conventional practice.

A still further object is to provide an apparatus of this class whereby the brake control elements thereof may be rendered inoperative at the will of the driver.

A still further object is to provide an apparatus of this character which may be readily and quickly installed as an attachment on the conventional vehicle.

A still further object is to provide a combined accelerator and brake control apparatus which is particularly designed for use in conjunction with hydraulic, pneumatic or air booster brakes, mechanical or any other type of brake to which the invention herein disclosed can be effectively applied.

A further object is to provide on the whole a novelly constructed accelerator and brake control apparatus, which is durable, efficient and inherently safe in its operation and requires little or no servicing.

Other objects, advantages and features of invention may appear from the accompanying drawings, the subjoined detail description, and the appended claims.

The accompanying drawings illustrate the invention in a form I at present deem preferable.

Figure 1 is a diagrammatical, fragmentary side elevational view of my control apparatus shown in conjunction with the braking system and carburetor of a vehicle.

Fig. 2 is a fragmentary plan view taken from 2—2 of Fig. 1 showing one arrangement whereby my control apparatus may cause operation of mechanical brakes by employing air vacuum or booster units or attachments.

Fig. 3 is a fragmentary plan view through line 3—3 of Fig. 1 showing the conventional accelerator pedal and particularly a spring arrangement for insuring return of the accelerator pedal to its normal or idling position.

Fig. 7 is a further enlarged plan view taken from the line 7—7 of Fig. 4.

Fig. 8 is a fragmentary sectional view of the brake control valve taken through line 8—8 of Fig. 7.

Fig. 9 is a transverse sectional view thereof taken through line 9—9 of Fig. 8.

Fig. 10 is a fragmentary elevational view illustrating the latch member employed to secure the brake operating elements in their inoperative position whereby the accelerator functions in the conventional manner.

Fig. 11 is a fragmentary sectional view thereof taken through line 11—11 of Fig. 10.

Figure 4:
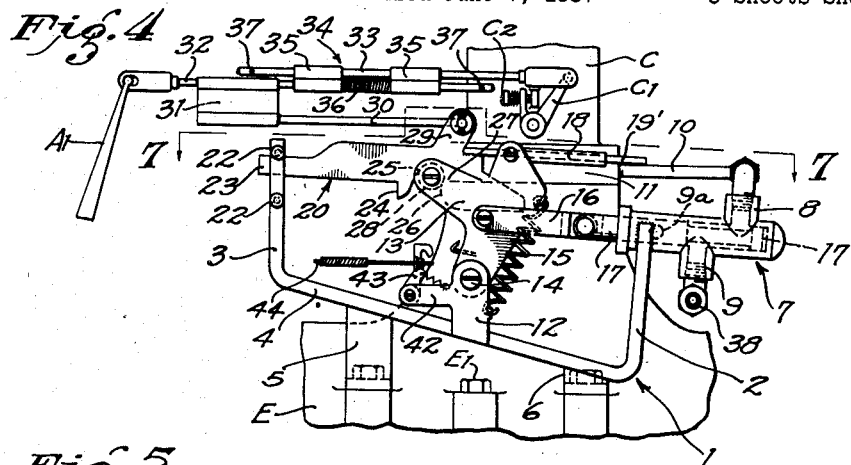
Fig. 4 is an enlarged side elevational view of the control apparatus per se with adjacent coacting portions of the vehicle shown fragmentarily, the various elements of the control apparatus being shown in their positions assumed when the accelerator is entirely released from foot pressure and the brakes are fully applied.

The principal elements of my accelerator and brake control apparatus are carried or associated with a frame structure 1 which is generally U-shaped with forward and rearward upstanding legs 2 and 3. Between the legs 2 and 3 the cross or connecting portion 4 of the frame structure is provided with downwardly and laterally directed supporting lugs 5 and 6 which are adapted to fit and be secured by convenient bolts E1 of the engine E with which the apparatus is associated.

The forward leg 2 of the frame structure 1 is welded or otherwise secured to a tubular valve housing 7 extending longitudinally with respect to the connecting portion of the frame structure. The valve housing is closed at its forward end and is provided with two axially displaced ports 8 and 9 and a vent 9a. The port 8 is connected by a tube 10 to a spacer ring 11 interposed between the carburetor C and the engine E as shown best in Fig. 6. The spacer ring eliminates the necessity of tapping either the carburetor or intake manifold. The tube 10 may be connected to the suction side of the engine at any convenient point, with or without the spacer ring.

Intermediate its ends the connecting portion of the frame structure is provided with a pair of upwardly extending bearing brackets 12 between which a pair of lever plates 13 are journaled by means of a journal pin 14. The lever plates extend upwardly and in addition to the journal pin 14 are yieldably connected with the brackets 12 by means of a spring 15 which is so positioned as to normally urge the upper ends of the lever plates forwardly or to the right as viewed in Figures 1, 4, 5 and 6.

The lever plates 13 journal a yoke 16 which extends forwardly and is joined to a piston valve 17 which fits the valve housing 7. The piston valve 17 is spool shaped and movable to connect or disconnect the ports 8 and 9 one from the other, and upon disconnecting these ports to connect ports 9 and 9a.

Above the yoke the lever plates journal a sleeve 18 which incorporates a traversing spacer bar 19 fitting between the lever plates and forming the journaled connection therewith as shown best in Fig. 7. The sleeve 18 receives a slide bar 19' which extends rearwardly and is secured to a keeper plate 20. The keeper plate continues rearwardly and is loosely slidable in the rear leg 3 of the frame structure 1. The leg 3 being provided with a vertical guide slit 21 traversed above and below the keeper plate by bearings 22. The rearward end portion 23 of the keeper plate is reduced in diameter so that when the keeper plate is in its forward position, it may shift vertically within limits of the bearings 22. The underside of the keeper plate is provided with a stop 24 adapted to limit rearward movement thereof, and forwardly of the stop is provided with a recess 25. The forward side of the recess 25 forms a cam face 26 which continues forwardly. The lever plates 13 are provided with rearwardly directed arms 27 which are connected by a spacer which journals a roller 28 adapted to coact with the cam face 26 and recess 25 as will be brought out more clearly hereinafter.

The upper side of the keeper plate is provided with a lug 29 which journals a connecting rod 30 joined by a connector 31 in laterally offset relation with an accelerator operating bar 32. The bar 32 is pivoted at its forward end to one arm A1 of the accelerator lever A which is connected by a lateral shaft A2 to the accelerator pedal A3. A stiff spring A4 tends to hold the accelerator lever A and parts of the control apparatus in a neutral position wherein the engine is idling and the brakes are set.

The operating bar 32 is connected with a second operating bar 33 through a lost motion means 34 comprising a pair of double sleeves 35 each sleeve being secured on one bar and slidable on the other. A spring 36 is interposed between the sleeves so that the operating bars 32 and 33 tend to increase their combined lengths. Pins 37 limit this movement. The operating bar 33 is connected with the conventional carburetor throttle valve lever C1, which is provided with a set screw C2 to limit its closing position.

The port 9 of the valve housing 7 is connected by a pipe line 38 to one or more booster units 39 of any conventional type, but preferably of the diaphragm type, which are suitably mounted on the vehicle frame as shown in Fig. 2. In the event a single or master booster unit is employed, this is connected by a link 40 to an equalizer shaft B1 of the brake system to which the several brake rods B2 are connected as well as brake lever rod B3 which is joined to the conventional brake pedal B4. A slot B5 is provided in the connection between the brake lever rod B3 and equalizer shaft lever B to permit operation of the system with my control apparatus without movement of the brake pedal.

In order that the brake control elements may be rendered inoperative so that the vehicle may be controlled in the conventional manner, the lever plates 13 are provided near their lower ends with a hook element 41 which is preferably positioned therebetween and serves as a spacer as shown best in Figs. 10 and 11. The bearing brackets 12 are provided with rearward extensions 42 between which is journaled a catch arm 43 adapted to engage the hook 41 and retain the lever plates 13 so that the piston valve 17 cannot be moved to connect ports 8 and 9. The catch arm 43 is operated by a conventional control cable 44 which extends to the dash board of the vehicle.

Operation of my combined accelerator and brake control apparatus is as follows:

When the accelerator pedal is in its normal, unengaged position, the arm A1 thereof is in its forward position shown in Figs. 1 and 4. By reason of the fact that spring A4 is stiffer than spring 36, spring 36 is compressed and the throttle valve is held in its closed position as limited by the set screw C2. The keeper plate is linked with the accelerator pedal through the connecting rod 30 and thus is normally held in a forward position with the roller 28 of the lever plates in the recess 25. When the lever plates are so positioned they tilt forwardly overcenter and are urged forwardly by the spring 15. Consequently, the piston valve 17 is held in position to connect the booster unit or units with the source of subatmospheric pressure and apply the brakes.

Figure 5:
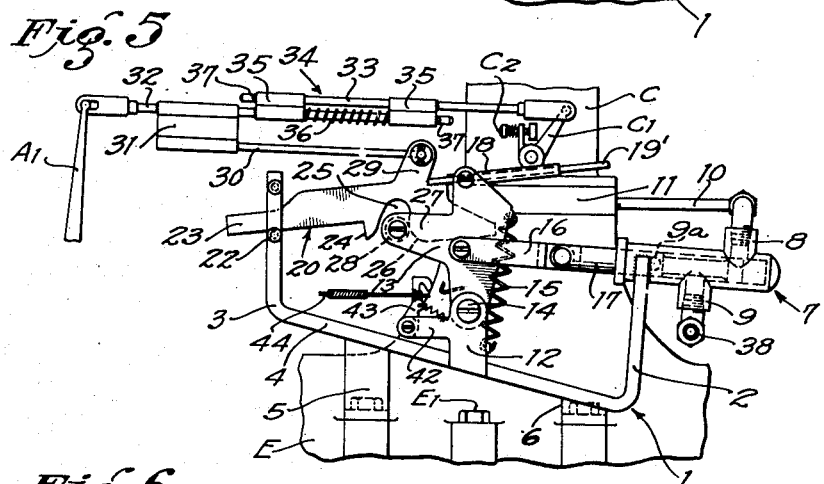
Fig. 5 is a similar view showing the various elements in their positions assumed upon initial movement of the accelerator from its idling position and in which the brakes are slightly applied, these also being the positions assumed when it is desired to slow down the vehicle by compression only.

The foregoing condition obtains until the accelerator pedal is depressed moving the arm A1 from the position shown in Fig. 4 toward the position shown in Fig. 5. This urges the keeper plate rearwardly and downwardly about the axis of the spacer bar 19, which movement tends to urge the lever plates counter-clockwise about the journal pin 14 and move the valve 17 rearwardly to separate ports 8 and 9. All this occurs before the throttle valve opens for the lost motion connection between operating bars 32 and 33 permits spring 36 to hold the throttle valve closed.

Figure 6:
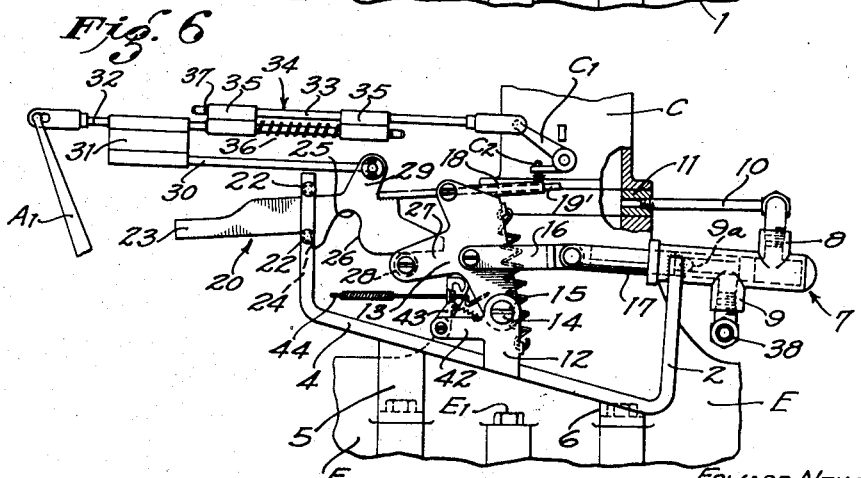
Fig. 6 is another similar view showing the various elements as they appear when the accelerator is depressed in which the brake control is locked in an inoperative position.

Continued movement of the accelerator pedal to cause arm A1 to move from the position shown in Fig. 5 to that shown in Fig. 6, and cause the roller 28 to ride on the cam surface 26 forcing the lever plates rearwardly to position the valve 17 so as to close ports 8 and 9 and bleed the booster unit through port 9a.

Thus, initial movement of the accelerator pedal releases the brakes without moving the throttle from idling position, and continued movement opens the throttle while rendering the automatic braking apparatus inoperative.

If, for any reason, it is desirable to operate the brakes in the usual manner, it is merely necessary to operate the catch arm 43 from the dash board to hold the valve in the position shown in Fig. 6. Should the brakes fail to operate automatically for any reason when ones foot is removed from the accelerator pedal, it is merely necessary to apply the brakes manually in the conventional manner, for my apparatus in no manner interferes with normal operation of the brakes.

I claim:

1. In a motor vehicle having a driver's compartment, brakes for the wheels thereof, a fuel regulator to control the power delivered by the motor and a control element in the driver's compartment, a valve including a booster in connection with the brakes to apply and release them, lost motion means connected to the fuel regulator to cause delayed operation thereof, shifting means including rocking and catch elements connected with the valve, and coupling means connecting the lost motion means and the shifting means with the control element in the driver's compartment so that the power delivered by the motor and the actuation of the brakes can be operated in alternation with an intervening time lag of short duration when the said elements are in motion.

2. The elements recited in claim 1 wherein the lost motion means is under resilient action independent of the shifting means so that when the brakes are being released the fuel regulator is held in closed position.

3. The elements of claim 1 wherein remote control means are provided for making the valve means inoperative.

4. The elements of claim 1 wherein the shifting means is provided with a holding element adapted to be engaged by a catch operable from the driver's compartment.

5. The elements of claim 1 wherein the catch element is coordinated with the lost motion means so that the catch element will cause the valve to be opened with a snap action when the lost motion means is contracted and the motor idling.

6. In a vehicle having a throttle with a remote control device therefor and a braking system, a lost motion linkage interposed between the throttle and the control device including yieldable means tending to hold the throttle near closed position during a predetermined initial movement of the control device, a brake actuating apparatus associated with the braking system, an overcenter control unit operable to urge the apparatus to a brake actuating position, and link means connecting the control unit with the control device and shiftable thereby to controllably release the brakes during said initial movement of the control device.

7. The combination with a vehicle having a throttle controlled engine, an operator's control for actuating the throttle and a braking system including: a unitary frame structure fixed to the vehicle engine in proximity to the throttle, said frame carrying a brake control valve and an overcenter operating device therefor, said device tending to snap actuate the valve into a brake actuating position, said device including a control means to restrain snap action of the device, and means connecting the control means with the operator's control.

8. The combination with a vehicle having a throttle controlled engine, a foot accelerator for actuating the throttle, and a braking system including: a frame structure supported by the engine in proximity to the throttle, a control valve and operating mechanism therefor supported by the frame, said mechanism including an overcenter operating device for actuating the valve with a snap action to start application of the brakes, and a latch means to restrain operation of the device when desired, booster means for operating the brakes of the braking system under control of the valve, a lost motion element interposed between the foot accelerator and throttle to provide a predetermined initial movement of the lever assembly before operation of the throttle, and means connecting the mechanism with the foot accelerator so that the valve can release the brakes just before the throttle is actuated.

EDWARD NEUSCHASTLE.